Figure 1:
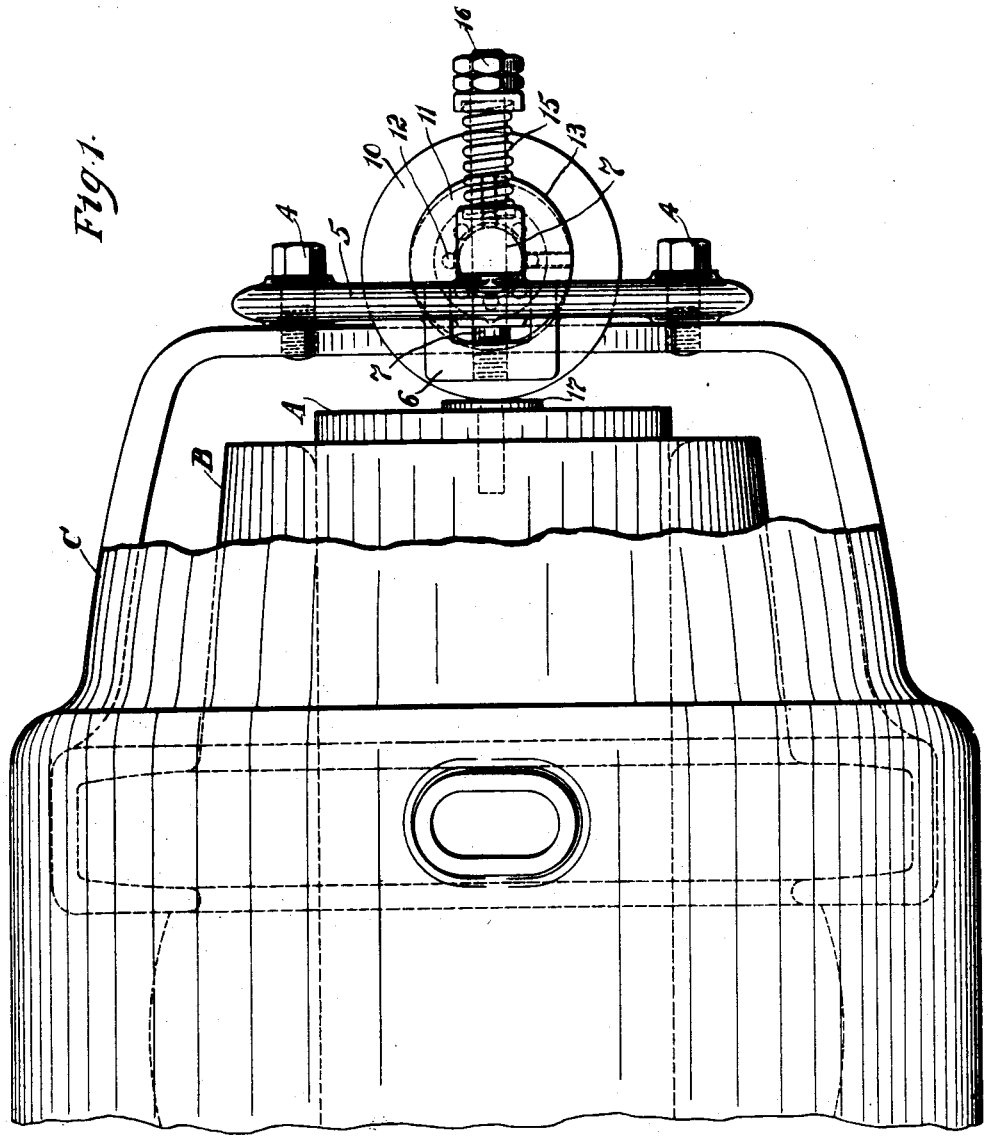

No. 869,825. PATENTED OCT. 29, 1907.
W. F. BOUCHÉ.
MECHANICAL SHAFT OSCILLATOR.
APPLICATION FILED JUNE 16, 1904.

2 SHEETS—SHEET 1.

Witnesses:
George J. Schwartz
Fred J. Kinsey

Inventor:
William F. Bouché.
By
Chas. E. Lord
Attorney.

No. 869,825.
PATENTED OCT. 29, 1907.
W. F. BOUCHÉ.
MECHANICAL SHAFT OSCILLATOR.
APPLICATION FILED JUNE 16, 1904.
2 SHEETS—SHEET 2.
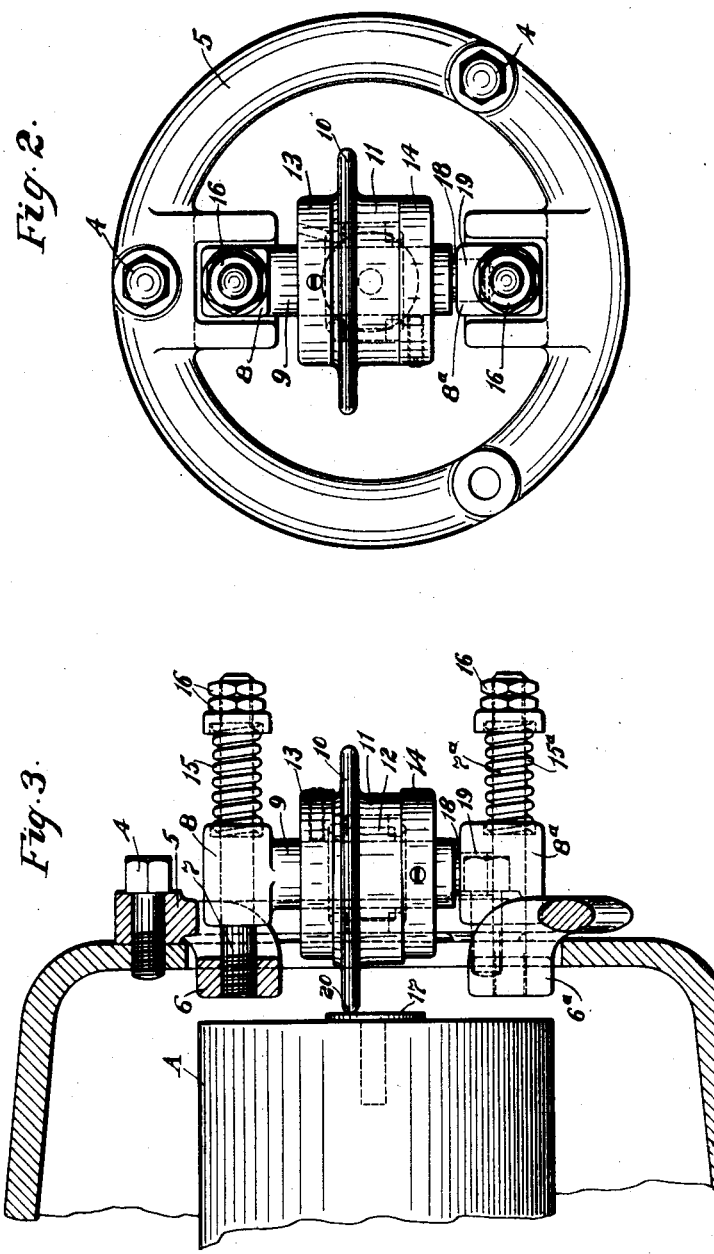
Witnesses:
George J. Schwartz.
Fred J. Kinny
Inventor:
William F. Bouché.
By
Chas. E. Lord
Attorney.

UNITED STATES PATENT OFFICE.

WILLIAM FOREST BOUCHÉ, OF NORWOOD, OHIO, ASSIGNOR TO THE BULLOCK ELECTRIC MANUFACTURING COMPANY, A CORPORATION OF OHIO.

MECHANICAL SHAFT-OSCILLATOR.

No. 869,825.  Specification of Letters Patent.  Patented Oct. 29, 1907.

Application filed June 16, 1904. Serial No. 212,853.

*To all whom it may concern:*

Be it known that I, WILLIAM FOREST BOUCHÉ, a citizen of the United States, residing at Norwood, in the county of Hamilton and State of Ohio, have invented certain new and useful Improvements in Mechanical Shaft-Oscillators, of which the following is a full, clear, and exact specification.

My present invention relates to means for oscillating or reciprocating a shaft longitudinally in its bearings, and particularly to a mechanical shaft oscillator as applied to dynamo electric machines.

It is a well known fact that an oscillatory movement given to the shaft carrying the rotating member of a dynamo electric machine causes said shaft to operate better in its bearings, and in the case of commutating machines causes the commutator to wear more evenly and reduces to a minimum the roughening and ridging of the commutator by the brushes. Many means for oscillating the shaft to produce the beneficial results desired have been suggested, but said means are cumbersome and expensive.

The object of my invention is to oscillate the shaft or rotating member by means of a mechanical device which is simple in its construction and is efficient and effective in its operation. To this end I employ a disk, preferably made of hardened steel, phosphor bronze or other equally hard material, eccentrically mounted on a spindle which is placed at an angle, preferably at right angles to the shaft it is desired to oscillate, the periphery of said disk being held, preferably by a yielding member, such as a spring, against the end of said shaft at a contact point out of alinement with the axis of rotation of the shaft. The rapidity of oscillation of said shaft may be adjusted by changing the position of said contact point relative to the axis of rotation of the shaft. Any desired rate of oscillation may be obtained, though it is preferred that the oscillator be adjusted to produce the so-called natural period of oscillation of the shaft or rotating element.

In the accompanying drawings which illustrate the preferred embodiment of my invention, Figure 1 represents a plan view of the shaft and end bearing of a dynamo electric machine equipped with my improved mechanical shaft oscillator; Fig. 2 is an end view of the oscillator removed from the machine; and Fig. 3 is a side elevation of the oscillator in position on a machine, the bearing housing being shown in section.

Referring now to the drawings, A represents the shaft of the rotating member of a dynamo-electric machine; B one of the bearings for said shaft, and C the bearing housing. Attached to the end of the bearing housing by means of the bolts 4 is a ring 5, upon which is mounted the oscillator. The bolts 7 and 7$^a$ project outwardly from the lugs 6 and 6$^a$, formed on said ring and have slidably mounted thereon the sleeves 8 and 8$^a$ between which the spindle 9 is supported. The spindle 9 has mounted thereon an eccentric member, in this case an eccentric disk 10, whose periphery contacts with the end of the shaft A. The hub 11 of said disk 10 is provided with roller bearings 12 so that the disk may rotate freely on the spindle 9. The collars 13 and 14 are adjustable on the spindle and when the disk is placed in the position desired to give a certain period of oscillation, said collars are secured by set screws and hold said disk in position. The disk 10 is held yieldingly against the shaft A by means of the springs 15 and 15$^a$, which are held in position on bolts 7 and 7$^a$ by the nuts 16. The end of shaft A is preferably provided with a bearing plate 17. In the preferred form of my device herein shown and described the spindle 9 is formed integral with the sleeve 8 and its opposite end is formed with a projection 18 which engages the recess 19 in the sleeve 8$^a$ when the parts of the oscillator are assembled as shown in the figures.

In the operation of my improved oscillator the eccentric disk 10 is held yieldingly in engagement with the shaft A at a point out of alinement with the axis of rotation of said shaft. It will thus be seen that as the shaft A rotates the eccentric disk 10 will be forced to rotate on the spindle 9 and as the disk changes from a position with the distance from its axis of rotation to the contact point a minimum to a position with the distance from said axis to the contact point a maximum, the shaft or rotating element will be moved to the left or away from said spindle 9. This thrust may be opposed by the action of gravity, by a spring (not shown), or as is more customary by the magnetic pull between the rotating member and the stationary member of the dynamo electric machine, and the shaft will be returned to its initial position by the opposing force. A small part of this thrust will of course be taken up by the springs 15 and 15$^a$ depending upon the force which the oscillator is operating against, but said springs are made strong enough to give the desired oscillating movement of said shaft. The distance of the contact point 20 from the axis of shaft A, determines the rate of oscillation, as it determines the rotary speed of the disk 10, and this distance may be varied by an adjustment of the disk 10 on the spindle 9 in a direction at right angles to the shaft axis. I prefer to so adjust the position of said disk that the shaft will oscillate at its natural period of oscillation.

In the appended claims, I aim to cover all modifications of the device herein shown and described which do not involve a departure from the spirit and scope of my invention.

Claims.

1. In combination, a shaft, a shaft oscillator comprising a cam-shaped or eccentric member mounted adjacent the end of the shaft, and means acting upon said member independent of the shaft for holding said member in engagement with the end of the shaft.

2. In combination, a shaft, a shaft oscillator comprising a cam-shaped or eccentric member mounted adjacent the end of the shaft, and means acting upon said member independent of the shaft for holding said member yieldingly in engagement with the end of the shaft.

3. In combination, a shaft, a shaft oscillator comprising a disk eccentrically mounted on a spindle at right angles to the axis of said shaft and having its periphery in engagement with the shaft end, and a yielding support for said spindle acting to hold said disk in engagement with the shaft.

4. In combination, a shaft, a shaft oscillator comprising an eccentric disk mounted with its axis of rotation at an angle to the axis of rotation of said shaft and with its periphery engaging the end of said shaft, and yielding supports for said eccentric disk.

5. In combination, a shaft, a spindle, a disk eccentrically mounted on said spindle and having its periphery engaging the end of said shaft at a point of alinement with the axis of rotation of the shaft, and a spring mounting for said spindle acting to hold said disk in engagement with said shaft so that the rotation of the latter will cause the disk to rotate and oscillate said shaft.

6. In combination, a shaft, an eccentrically mounted disk having its periphery engaging the end of said shaft at a point out of alinement with the axis of rotation of the shaft, a support upon which said disk is rotatably mounted, and means for adjusting the position of said disk relative to its support so that the period of oscillation may be varied.

7. A shaft oscillator comprising a rotatable disk, a spindle on which said disk is eccentrically mounted, and means for maintaining said disk yieldingly in engagement with the shaft to be oscillated, said means comprising a spring mounting for said spindle.

8. In combination, a shaft, and a shaft oscillator comprising a rotatable disk adapted to engage said shaft, a spindle on which said disk is eccentrically mounted, and means for adjusting the position of said disk on said spindle.

9. In combination, a shaft, a shaft oscillator comprising a spindle carrying an eccentric member, said spindle being movably mounted adjacent the end of the shaft so as to be capable of a reciprocating movement, and yielding means for holding the eccentric member in engagement with the end of the shaft.

10. A shaft oscillator, comprising parallel bolts, a spindle slidably supported on said bolts, a disk eccentrically mounted on said spindle, and springs bearing against said spindle for the purpose of maintaining said disk in contact with the end of the shaft to be oscillated.

11. A shaft oscillator, comprising parallel bolts, a spindle slidably supported on said bolts, a disk eccentrically mounted on said spindle, springs bearing against said spindle for the purpose of maintaining said disk in contact with the end of the shaft to be oscillated, and means for adjusting the position of said disk on said spindle.

In witness whereof I have hereunto set my hand this 14th day of June, 1904.

WILLIAM FOREST BOUCHÉ.

Witnesses:
LOUIS C. MARBURG,
LEO W. GROTHAUS.